United States Patent
Terasawa

(10) Patent No.: US 9,681,060 B2
(45) Date of Patent: Jun. 13, 2017

(54) IMAGING APPARATUS, METHOD OF CORRECTING FLICKER, AND PROGRAM

(71) Applicant: SONY CORPORATION, Tokyo (JP)

(72) Inventor: Takashi Terasawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 14/642,061

(22) Filed: Mar. 9, 2015

(65) Prior Publication Data
US 2015/0281547 A1    Oct. 1, 2015

(30) Foreign Application Priority Data
Mar. 31, 2014   (JP) .................. 2014-074398

(51) Int. Cl.
| H04N 9/73 | (2006.01) |
| H04N 5/235 | (2006.01) |
| H04N 5/238 | (2006.01) |
| H04N 5/232 | (2006.01) |

(52) U.S. Cl.
CPC ........... *H04N 5/2357* (2013.01); *H04N 5/238* (2013.01); *H04N 5/23245* (2013.01)

(58) Field of Classification Search
CPC .... H04N 5/2357; H04N 5/238; H04N 5/2254; G03B 9/08
USPC ........................................... 348/226.1–228.1
See application file for complete search history.

(56) References Cited

U.S. PATENT DOCUMENTS

| 5,619,266 A * | 4/1997 | Tomita ................. H04N 5/2353 348/221.1 |
| 7,394,498 B2 * | 7/2008 | Takaoka .............. G02F 1/13306 348/340 |
| 8,228,418 B2 * | 7/2012 | Pillman .................. H04N 5/217 348/342 |
| 2005/0104998 A1 * | 5/2005 | Udaka .................... H04N 5/238 348/363 |
| 2008/0309791 A1 * | 12/2008 | Nishiwaki .......... H04N 5/23293 348/226.1 |
| 2013/0188074 A1 * | 7/2013 | Nakabayashi ......... H04N 5/238 348/223.1 |
| 2014/0247386 A1 * | 9/2014 | Takagi ..................... G03B 9/02 348/362 |

(Continued)

FOREIGN PATENT DOCUMENTS

| JP | 2011-259390 A | 12/2011 |
| JP | 2012-104994 A | 5/2012 |

*Primary Examiner* — Kelly L Jerabek
(74) *Attorney, Agent, or Firm* — Oblon, McClelland, Maier & Neustadt, L.L.P.

(57) ABSTRACT

An imaging apparatus includes a transmittance adjusting unit configured to be capable of adjusting a transmittance of light depending on an applied voltage; an image sensor configured to capture an image by exposing light that has been transmitted through the transmittance adjusting unit; and a controller configured to acquire a plurality of pieces of image data by causing the image sensor to capture an image, to determine a cycle of flicker between the plurality of pieces of image data based on the plurality of pieces of image data, to calculate a transmittance for correcting the flicker between the plurality of pieces of image data based on the cycle of the flicker, and to set the transmittance of the transmittance adjusting unit to the calculated transmittance to cause the image sensor to capture an image.

5 Claims, 6 Drawing Sheets

(56) References Cited

U.S. PATENT DOCUMENTS

2014/0300805 A1* 10/2014 Davis .................... H04N 5/238
348/362

* cited by examiner

IMAGING APPARATUS, METHOD OF CORRECTING FLICKER, AND PROGRAM

CROSS REFERENCE TO RELATED APPLICATIONS

This application claims the benefit of Japanese Priority Patent Application JP 2014-074398 filed Mar. 31, 2014, the entire contents of which are incorporated herein by reference.

BACKGROUND

The present disclosure relates to a technique of an imaging apparatus of the like that captures an image using an image sensor.

In the past, an imaging apparatus that is capable of capturing a still image and a moving image has been widely known (see, for example, Japanese Patent Application Laid-open No. 2012-104994 (paragraphs 0038 and 0055, and FIG. 3)).

In the imaging apparatus disclosed in Japanese Patent Application Laid-open No. 2012-104994 (paragraphs 0038 and 0055, and FIG. 3), analog image data acquired in an image sensor is output to an analog signal processing unit. An analog signal process (amplification, etc.) is performed on the analog image data output to the analog signal processing unit before the processed data is output to an A/D conversion unit. Then, the output data is converted into digital image data in the A/D conversion unit. The digital image data is output to a digital signal processing unit. Then, a noise removal process, a white balance process, a color correction process, an edge emphasizing process, a gamma correction process, and the like, are performed on the output data in the digital signal processing unit. The digital image data that has been subjected to these processes is output from the digital signal processing unit, and the output data is displayed on a liquid crystal panel and stored in a storage device.

It has been known that a phenomenon called inter-frame flicker in which the brightness level varies between captured image data occurs if a moving image is captured using an image sensor under illumination of fluorescent light whose brightness varies depending on a power frequency (50 Hz and 60 Hz), for example.

As a method of correcting the inter-frame flicker, a method of adjusting an electronic shutter (adjusting the exposure period in the image sensor) is used in some cases (see, for example, Japanese Patent Application Laid-open No. 2011-259390 (paragraph 0008)).

SUMMARY

However, the method of adjusting an electronic shutter has such a problem that the dynamic resolution is disturbed and the quality of the image data is degraded. As described above, in the past, such a problem that it may be impossible to effectively correct the inter-frame flicker from a viewpoint of the degradation of image quality or the like has occurred.

In view of the circumstances as described above, it is desirable to provide a technique of an imaging apparatus or the like that is capable of effectively correcting the inter-frame flicker.

According to an embodiment of the present disclosure, there is provided an imaging apparatus including a transmittance adjusting unit, an image sensor, and a controller. The transmittance adjusting unit is configured to be capable of adjusting a transmittance of light depending on an applied voltage. The image sensor is configured to capture an image by exposing light that has been transmitted through the transmittance adjusting unit. The controller is configured to acquire a plurality of pieces of image data by causing the image sensor to capture an image, to determine a cycle of flicker between the plurality of pieces of image data based on the plurality of pieces of image data, to calculate a transmittance for correcting the flicker between the plurality of pieces of image data based on the cycle of the flicker, and to set the transmittance of the transmittance adjusting unit to the calculated transmittance to cause the image sensor to capture an image.

With this imaging apparatus, it is possible to effectively correct the flicker between the plurality of pieces of image data (inter-frame flicker) by adjusting the transmittance of the transmittance adjusting unit.

In the imaging apparatus, the controller may be configured to acquire image data by causing the image sensor to capture an image, to determine a cycle of flicker in the image data based on the image data, to calculate a transmittance for correcting the flicker in the image data based on the cycle of the flicker, and to set the transmittance of the transmittance adjusting unit to the calculated transmittance to cause the image sensor to capture an image.

With this imaging apparatus, it is possible to effectively correct the flicker in the image data (in-frame flicker) by adjusting the transmittance of the transmittance adjusting unit.

In the imaging apparatus, the controller may be configured to cause the image sensor to capture an image while changing the transmittance of the transmittance adjusting unit in an exposure period in which the exposure is performed in the image sensor when setting the transmittance of the transmittance adjusting unit to the calculated transmittance to cause the image sensor to capture an image.

Accordingly, it is possible to effectively correct the flicker in the image data (in-frame flicker).

In the imaging apparatus, the transmittance adjusting unit may be a liquid crystal neutral density (ND) filter.

Accordingly, it is possible to switch the transmittance at high speed.

According to another embodiment of the present disclosure, there is provided an imaging apparatus including a transmittance adjusting unit, an image sensor, and a controller. The transmittance adjusting unit is configured to be capable of adjusting a transmittance of light depending on an applied voltage. The image sensor is configured to capture an image by exposing light that has been transmitted through the transmittance adjusting unit. The controller is configured to acquire image data by causing the image sensor to capture an image, to determine a cycle of flicker in the image data based on the image data, to calculate a transmittance for correcting the flicker in the image data based on the cycle of the flicker, and to set the transmittance of the transmittance adjusting unit to the calculated transmittance to cause the image sensor to capture an image.

With this imaging apparatus, it is possible to effectively correct the flicker in the image data (in-frame flicker) by adjusting the transmittance of the transmittance adjusting unit.

According to another embodiment of the present disclosure, there is provided an imaging apparatus including a transmittance adjusting unit, an image sensor, and a controller. The transmittance adjusting unit is configured to be capable of adjusting a transmittance of light depending on an applied voltage. The image sensor is configured to capture an image by exposing light that has been transmitted through the transmittance adjusting unit. The controller is configured to cause the image sensor to capture an image while changing the transmittance of the transmittance adjusting unit in an exposure period in which the exposure is performed in the image sensor.

Accordingly, it is possible to effectively correct the flicker in the image data (in-frame flicker).

According to another embodiment of the present disclosure, there is provided a method of correcting flicker including acquiring a plurality of pieces of image data by causing an image sensor to capture an image, the image sensor being configured to capture an image by exposing light that has been transmitted through a transmittance adjusting unit configured to be capable of adjusting a transmittance of light depending on an applied voltage. A cycle of flicker between the plurality of pieces of image data is determined based on the plurality of pieces of image data. A transmittance for correcting the flicker between the plurality of pieces of image data is calculated based on the cycle of the flicker. The transmittance of the transmittance adjusting unit is set to the calculated transmittance to cause the image sensor to capture an image.

According to another embodiment of the present disclosure, there is provided a method of correcting flicker including acquiring image data by causing an image sensor to capture an image, the image sensor being configured to capture an image by exposing light that has been transmitted through a transmittance adjusting unit configured to be capable of adjusting a transmittance of light depending on an applied voltage. A cycle of flicker in the image data is determined based on the image data. A transmittance for correcting the flicker in the image data is calculated based on the cycle of the flicker. The transmittance of the transmittance adjusting unit is set to the calculated transmittance to cause the image sensor to capture an image.

According to another embodiment of the present disclosure, there is provided a method of correcting flicker including causing an image sensor to capture an image while changing a transmittance of a transmittance adjusting unit in an exposure period in which exposure is performed in the image sensor configured to capture an image by exposing light that has been transmitted through a transmittance adjusting unit configured to be capable of adjusting a transmittance of light depending on an applied voltage.

According to another embodiment of the present disclosure, there is provided a program that causes an imaging apparatus to execute the steps of acquiring a plurality of pieces of image data by causing an image sensor to capture an image, the image sensor being configured to capture an image by exposing light that has been transmitted through a transmittance adjusting unit configured to be capable of adjusting a transmittance of light depending on an applied voltage, determining a cycle of flicker between the plurality of pieces of image data based on the plurality of pieces of image data, calculating a transmittance for correcting the flicker between the plurality of pieces of image data based on the cycle of the flicker, and setting the transmittance of the transmittance adjusting unit to the calculated transmittance to cause the image sensor to capture an image.

According to another embodiment of the present disclosure, there is provided a program that causes an imaging apparatus to execute the steps of acquiring image data by causing an image sensor to capture an image, the image sensor being configured to capture an image by exposing light that has been transmitted through a transmittance adjusting unit configured to be capable of adjusting a transmittance of light depending on an applied voltage, determining a cycle of flicker in the image data based on the image data, calculating a transmittance for correcting the flicker in the image data based on the cycle of the flicker, and setting the transmittance of the transmittance adjusting unit to the calculated transmittance to cause the image sensor to capture an image.

According to another embodiment of the present disclosure, there is provided a program that causes an imaging apparatus to execute the step of causing an image sensor to capture an image while changing a transmittance of a transmittance adjusting unit in an exposure period in which exposure is performed in the image sensor configured to capture an image by exposing light that has been transmitted through a transmittance adjusting unit configured to be capable of adjusting a transmittance of light depending on an applied voltage.

As described above, according to the present disclosure, it is possible to provide a technique of an imaging apparatus or the like that is capable of effectively correcting the inter-frame flicker.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments according to the present disclosure will be described with reference to the drawings.

First Embodiment (Entire Configuration of Imaging Apparatus 1 and Configuration of Each Unit)

Figure 1:
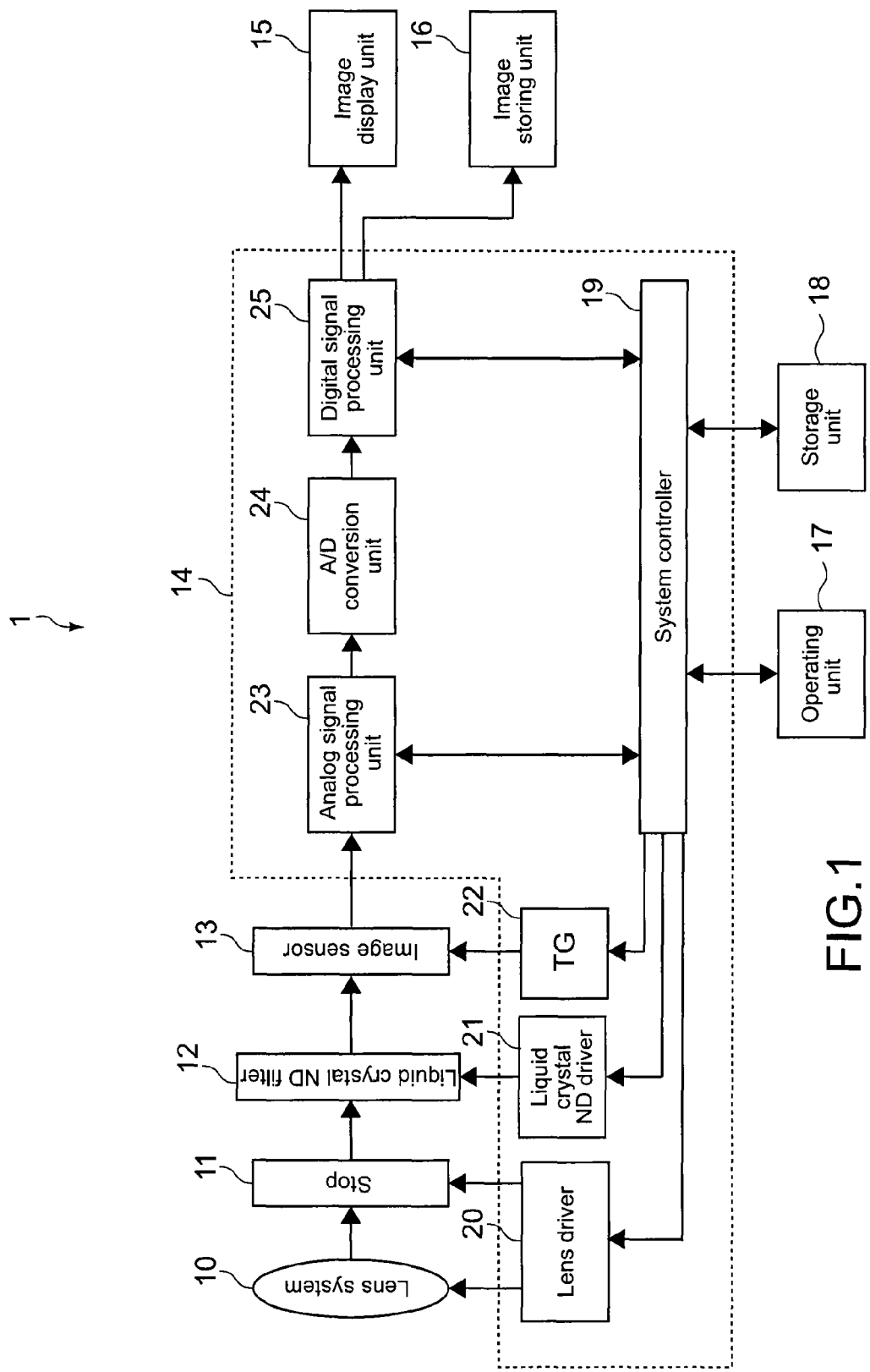
FIG. 1 is a block diagram showing an imaging apparatus according to a first embodiment of the present disclosure.

FIG. 1 is a block diagram showing an imaging apparatus 1 according to a first embodiment of the present disclosure. The imaging apparatus 1 shown in FIG. 1 is a digital camera (digital still camera, digital video camera) that is capable of capturing a still image and a moving image. In addition, the imaging apparatus 1 is configured to be capable of reproducing stored image data.

As shown in FIG. 1, the imaging apparatus 1 includes a lens system 10, a stop 11, a liquid crystal neutral density (ND) filter 12 (transmittance adjusting unit), an image sensor 13, a controller 14, an image display unit 15, an image storing unit 16, an operating unit 17, and a storage unit 18. The controller 14 includes a system controller 19, a lens driver 20, a liquid crystal ND driver 21, a timing generator 22 (TG), an analog signal processing unit 23, an A/D conversion unit 24, and a digital signal processing unit 25.

The lens system 10 includes various kinds of lenses such as a zoom lens and a focus lens, and causes an image of object light to be formed on the exposure surface of the image sensor 13 by these lenses. The stop 11 is configured so that the amount of object light can be mechanically adjusted by adjusting the opening degree of the stop 11. In the example shown in FIG. 1, the stop 11 is arranged behind the lens system 10. However, the stop 11 may be arranged in an optical path in the lens system 10 (e.g., between a zoom lens and a focus lens).

The lens driver 20 is configured to control the positions of the zoom lens, the focus lens, and the stop 11, and the opening degree of the stop 11 in response to the instruction from the system controller 19.

The liquid crystal ND filter 12 is configured to be capable of adjusting the transmittance of light (concentration) depending on an applied voltage, and to adjust the amount of object light that enters the image sensor 13 by adjusting the transmittance depending on an applied voltage.

The liquid crystal ND driver 21 is configured to control the transmittance (concentration) of the liquid crystal ND filter 12 by controlling the voltage applied to the liquid crystal ND filter 12 in response to the instruction from the system controller 19.

The image sensor 13 includes a complementary metal oxide semiconductor (CMOS) sensor, a charge coupled device (CCD) sensor, or the like. The image sensor 13 is configured to capture an image by exposing the incident object light that has been transmitted through the liquid crystal ND filter 12. Specifically, the image sensor 13 includes a plurality of pixels (R pixel, G pixel, and B pixel), and is configured to convert the object light that has entered the exposure surface into an electronic signal by photoelectric conversion for each pixel, and to output the obtained signals of three primary colors (R, G, and B) to the analog signal processing unit 23 as analog image data.

The timing generator 22 (TG) is configured to generate a drive pulse necessary for driving the image sensor 13 in response to the instruction from the system controller 19, and to supply the generated drive pulse to the image sensor 13. The timing generator 22 drives the image sensor 13, thereby capturing an image of the object (electronic shutter) to obtain an image of the object. Moreover, the timing generator 22 adjusts the shutter speed of the image sensor 13, thereby controlling the exposure period at the time when the image is acquired. It should be noted that the timing generator 22 causes the image sensor 13 to capture an image at a frame rate of 30 fps, for example.

The analog signal processing unit 23 is configured to perform a correlated double sampling (CDS) process, a gain process, and the like, on the image signal output from the image sensor 13.

The A/D conversion unit 24 is configured to convert the analog image data output from the analog signal processing unit 23 into digital image data, and to output the converted data to the digital signal processing unit 25.

The digital signal processing unit 25 is configured to perform various kinds of digital signal processes such as a noise removal process, a white balance adjustment process, a color correction process, an edge emphasizing process, a gamma correction process, and the like, on the digital image data output from the A/D conversion unit 24, and to output the processed data to the image display unit 15 and the image storing unit 16. Moreover, the digital signal processing unit 25 is configured to detect the digital image data output from the A/D conversion unit 24 and to output the detected data to the system controller 19, in an inter-frame flicker correction mode to be described later.

The image display unit 15 includes a liquid crystal display, an organic electroluminescence (EL) display, or the like. The image display unit 15 is configured to display various kinds of images on the screen thereof. For example, the image display unit 15 displays a through image on the screen by displaying image data output from the digital signal processing unit 25 in real time. Moreover, the image display unit 15 is configured to perform a reproduction process on the image stored in the image storing unit 16. The through image is displayed on the screen so that the user can focus the viewing angle when a still image or a moving image is captured.

The image storing unit 16 is configured to store the image data output from the digital signal processing unit 25, metadata (e.g, time and date on which the image data is acquired) related to the image data, or the like. The image storing unit 16 includes a semiconductor memory, an optical disc, a hard disc (HD), or the like. The image storing unit 16 may be fixed in the imaging apparatus 1, or may be configured to be able to be attached to/removed from the imaging apparatus 1.

The system controller 19 includes a central processing unit (CPU), for example, and is configured to collectively control the units of the imaging apparatus 1. The specific process performed by the system controller 19 will be described later in detail in the column of explanation of operation.

It should be noted that in this embodiment, a still image capturing mode, a moving image capturing mode (recording mode), and a reproduction mode are prepared. In the still image capturing mode, a still image is captured. In the moving image capturing mode, a moving image is captured. In the reproduction mode, an image stored in the image storing unit 16 is reproduced. Furthermore, in this embodiment, two modes of a normal mode and an inter-frame flicker correction mode are prepared in both of the still image capturing mode and the moving image capturing mode.

In the inter-frame flicker correction mode, various kinds of processes for correcting inter-frame flicker are performed. On the other hand, in the normal mode, various kinds of processes for correcting inter-frame flicker are not performed and an image is captured by the normal operation.

The storage unit 18 includes a non-volatile memory (e.g., read only memory (ROM)) in which various kinds of programs or various kinds of data are fixedly stored, and a volatile memory (e.g., random access memory (RAM)) used as a working area of the system controller 19. The program may be read from a portable recording medium such as an optical disc and a semiconductor memory, or may be downloaded from a server apparatus in a network.

In the non-volatile memory, a transmittance-voltage table is stored as the various kinds of data. The transmittance-voltage table shows a relationship between the transmittance of the liquid crystal ND filter 12 and an applied voltage. When controlling the transmittance of the liquid crystal ND filter 12, the system controller 19 refers to the transmittance-voltage table to read an applied voltage corresponding to a desired transmittance, and instructs the liquid crystal ND driver 21 to apply the read applied voltage.

The operating unit 17 includes a power switch, a shutter button, a recording button, a setting button, and a mode switching button, for example. The power switch is the operating unit 17 for switching on/off of the power supply of the imaging apparatus 1. Moreover, the shutter button is the operating unit 17 for storing image data as still image data in the still image capturing mode, and the recording button is the operating unit 17 for recording image data as moving image data in the moving image capturing mode.

The setting button is used to adjust the positions of a zoom lens, a focus lens, and the stop 11, and to adjust the opening degree of the stop 11, for example. Moreover, the setting button is used to adjust the electronic shutter, to change the gain value in the gain process performed by the analog signal processing unit 23, and to change various setting values in various processes performed by the digital signal processing unit 25. The mode switching button is the operating unit 17 for switching between the normal mode and the inter-frame flicker correction mode.

The operating unit 17 may be achieved by the mechanical push button type operating unit 17, or by an electrostatic capacity type touch sensor or resistive film touch sensor provided on the image display unit 15.

(Generation Principle of Inter-Frame Flicker)

Next, the generation principle of inter-frame flicker will be described.

Figure 2:
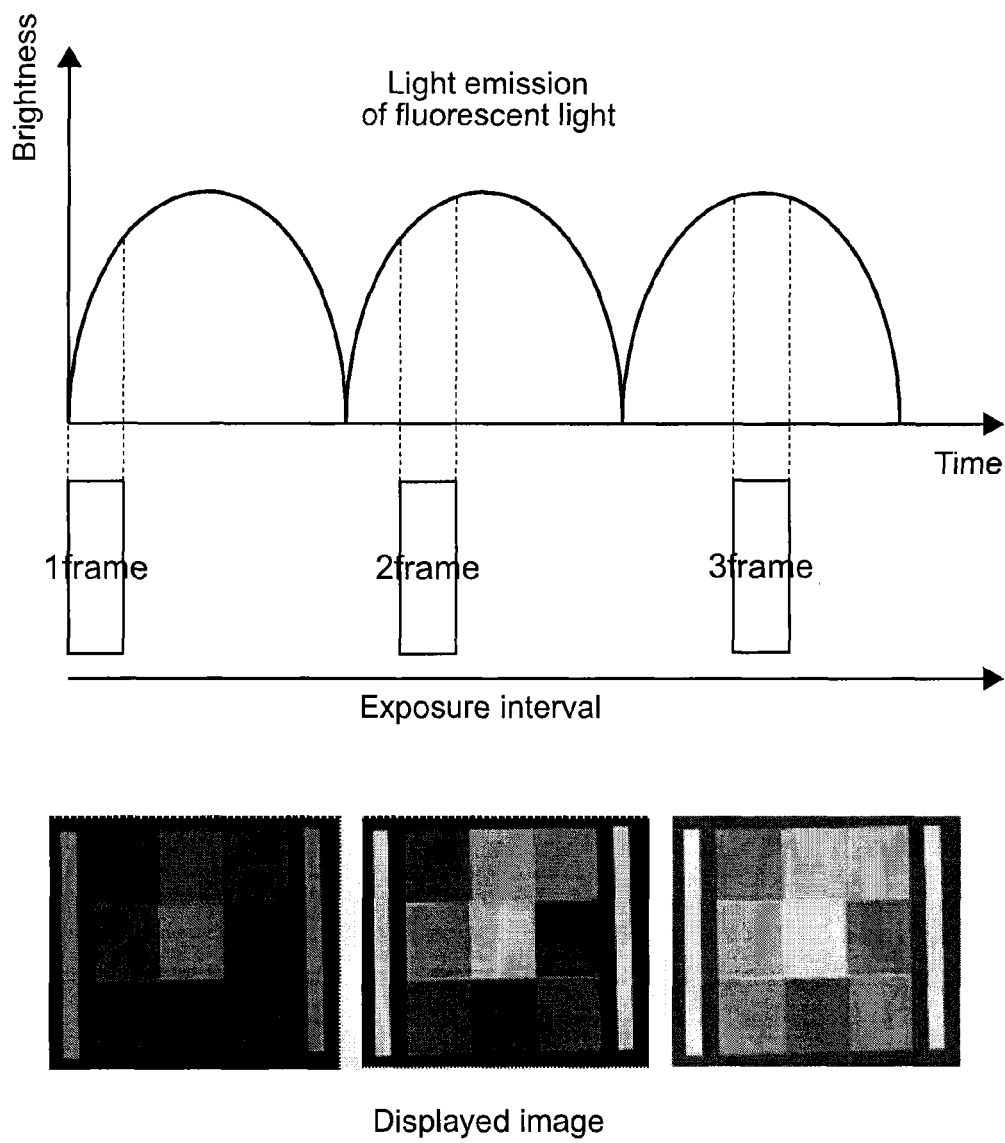
FIG. 2 is a diagram for explaining the generation principle of inter-frame flicker.

FIG. 2 is a diagram for explaining the generation principle of inter-frame flicker. With reference to the upper side of FIG. 2, fluorescent light repeats blinking with frequencies (100 Hz, 120 Hz) being two times as large as power supply frequencies (50 Hz, 60 Hz). On the other hand, the image sensor 13 captures an image at a frame rate of 30 fps, for example (see the central part of FIG. 2).

As described above, because the frequency of blinking in the fluorescent light is deviated from the frame rate of the image sensor 13, the amounts of exposure in frames are different from each other. Therefore, as shown in the lower side of FIG. 2, the brightness of the entire image displayed on the image display unit 15 is different for the frames. Accordingly the image displayed on the image display unit 15 repeats blinking at a predetermined cycle. This is the generation principle of inter-frame flicker.

If inter-frame flicker occurs, the image displayed on the image display unit 15 blinks, which makes the user feel discomfort.

The imaging apparatus 1 according to this embodiment reduces such inter-frame flicker by controlling the transmittance of the liquid crystal ND filter 12.

(Explanation of Operation)

Figure 3:
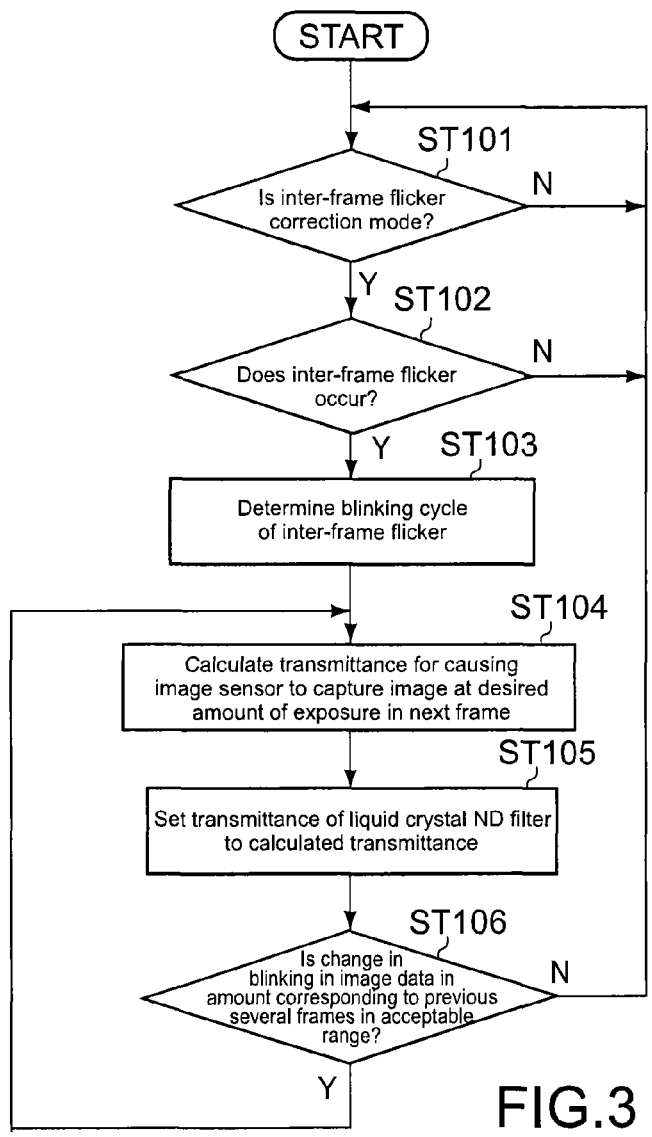
FIG. 3 is a flowchart showing a process performed by the imaging apparatus according to the first embodiment of the present disclosure.

Next, the process performed by the imaging apparatus 1 according to the first embodiment will be described in detail. FIG. 3 is a flowchart showing a process performed by the imaging apparatus 1 according to the first embodiment.

First, the system controller 19 determines whether or not the current mode is the inter-frame flicker correction mode (Step 101). It should be noted that switching between the normal mode and the inter-frame flicker correction mode can be performed by the mode switching button.

In the case where the current mode is not the inter-frame flicker correction mode (NO in Step 101), that is, in the case where the current mode is the normal mode, the process returns to Step 101 and the system controller 19 determines whether or not the current mode is the inter-frame flicker correction mode again.

On the other hand, in the case where the current mode is the inter-frame flicker correction mode (YES in Step 101), the digital signal processing unit 25 detects the digital image data input from the A/D conversion unit 24 and outputs the detection results to the system controller 19. Then, the system controller 19 determines whether or not inter-frame flicker occurs, based on the detection results (Step 102).

In Step 102, the system controller 19 determines whether or not inter-frame flicker occurs by judging whether or not the brightness of the entire image data periodically varies based on the results obtained by detecting image data in the amount corresponding to a predetermined number of frames (e.g., 5 frames).

In the case where no inter-frame flicker occurs (NO in Step 102), the process returns to Step 101 and the system controller 19 determines whether or not the current mode is the inter-frame flicker correction mode again.

On the other hand, in the case where inter-frame flicker occurs (YES in Step 102), the system controller 19 determines the blinking cycle of the inter-frame flicker (Step 103). At this time, the system controller 19 determines the blinking cycle of the inter-frame flicker based on information on the brightness of image data in the amount corresponding to a predetermined number of frames, the drive frame rate of the image sensor 13 (e.g., 30 fps), the exposure period of the image sensor 13, and the transmittance (concentration) of the liquid crystal ND filter 12.

Next, the system controller 19 calculates the transmittance of the liquid crystal ND filter 12 for causing the image sensor 13 to capture an image at a desired amount of exposure in the next frame (correcting the inter-frame flicker) based on the blinking period of the inter-frame flicker (Step 104).

Next, the system controller 19 sets the transmittance of the liquid crystal ND filter 12 to the calculated transmittance at timing when the image sensor 13 capture image data in the next frame (Step 105).

At this time, the system controller 19 refers to the transmittance-voltage table to read an applied voltage corresponding to the transmittance calculated in Step 105, and instructs the liquid crystal ND driver 21 to apply the read applied voltage. It should be noted that the system controller 19 may calculate a voltage in real time in accordance with a program instead of referring to the table.

Figure 4:
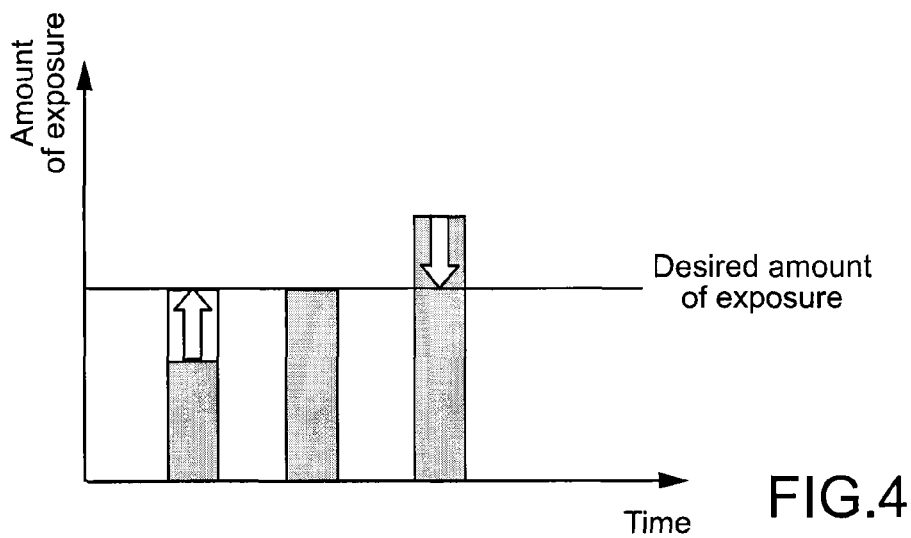
FIG. 4 is a diagram for explaining the relationship between a desired amount of exposure and the transmittance of a liquid crystal ND filter.

FIG. 4 is a diagram for explaining the relationship between a desired amount of exposure and the transmittance of the liquid crystal ND filter 12. In the case where the amount of exposing the image sensor 13 is expected to be less than the desired amount of exposure in relation to the blinking cycle as shown by a bar graph on the left side of FIG. 4, the transmittance of the liquid crystal ND filter 12 is set to be a relatively large value to cause the amount of exposing the image sensor 13 to be close to the desired amount of exposure.

In the case where the amount of exposing the image sensor 13 is expected to be equivalent to the desired amount of exposure in relation to the blinking cycle as shown by a bar graph on the central part of FIG. 4, the transmittance of the liquid crystal ND filter 12 is set to be a relatively intermediate value. Moreover, in the case where the amount of exposing the image sensor 13 is expected to be more than the desired amount of exposure in relation to the blinking cycle as shown by a bar graph on the right side of FIG. 4, the transmittance of the liquid crystal ND filter 12 is set to be a relatively small value to cause the amount of exposing the image sensor 13 to be close to the desired amount of exposure.

In this embodiment, the influence of inter-frame flicker is eliminated by maintain the amount of exposing the image sensor 13 at a constant level in this way.

When the transmittance of the liquid crystal ND filter 12 is set, an image of the object, which has been transmitted through the liquid crystal ND filter 12, is formed on the exposure surface of the image sensor 13, and the image sensor 13 captures image data. The analog signal processing unit 23 performs various kinds of processes on the image data before the A/D conversion unit 24 converts the processed data into a digital signal. The digital signal processing unit 25 performs various kinds of processes on the image data converted into a digital signal before the processed data is output from the digital signal processing unit 25.

When outputting the image data, the digital signal processing unit 25 performs different processes depending on whether the current mode is the still image capturing mode or the moving image capturing mode.

Specifically, in the case where the current mode is the still image capturing mode, the digital signal processing unit 25 outputs image data to the image display unit 15 to cause the image display unit 15 to display a through image on the screen of the image display unit 15. Then, the digital signal processing unit 25 outputs image data to the image storing unit 16 to cause the image storing unit 16 to store the image data as a still image at timing when the shutter button is operated.

In the case where the current mode is the moving image capturing mode, the digital signal processing unit 25 outputs image data to the image display unit 15 to cause the image display unit 15 to display a through image on the screen of the image display unit 15 similarly to the case where the current mode is the still image capturing mode. On the other hand, unlike the case where the current mode is the still image capturing mode, the digital signal processing unit 25 outputs image data to the image storing unit 16. The image data is stored in the image storing unit 16 as an image constituting a part of a moving image.

In this embodiment, the influence of inter-frame flicker can be eliminated from a through image displayed on the image display unit 15, and a moving image and a moving image stored in the image storing unit 16.

With reference to FIG. 3 again, when the transmittance of the liquid crystal ND filter 12 is set, the system controller 19 then determines whether or not the change in blinking in image data in the amount corresponding to previous several frames (e.g., 5 frames) is in the acceptable range (Step 106).

In the case where the change in blinking is in the acceptable range (YES in Step 106), the process of the system controller 19 returns to Step 104 because the determination of the blinking cycle of inter-frame flicker is expected to be accurate. Then, the system controller 19 calculates the transmittance of the liquid crystal ND filter 12 for causing the image sensor 13 to capture an image at a desired amount of exposure in the next frame (correcting the inter-frame flicker) based on the blinking period of the inter-frame flicker.

Then, the system controller 19 sets the transmittance of the liquid crystal ND filter 12 to the calculated transmittance at timing when the image sensor 13 captures image data in the next frame (Step 105).

It should be noted that in this embodiment, it needs to change the transmittance of the liquid crystal ND filter 12 to a next transmittance in a period from when an image is captured to when a next image is captured (e.g., 33.3 ms). It is possible to change the transmittance in such a short period by using the liquid crystal ND filter 12 having a high-speed responsiveness.

In the case where the change in blinking in image data in previous several frames is not in the acceptable range (NO in Step 106), the system controller 19 performs processes from Step 101 to Step 103 to determine the blinking cycle of inter-frame flicker again because the determination of the blinking cycle of inter-frame flicker is not expected to be accurate.

(Operation, Etc.)

As described above, in this embodiment, the blinking cycle of inter-frame flicker is determined based on image data in a plurality of frames. Then, based on the blinking cycle of the flicker, a transmittance for causing the image sensor 13 to capture an image at a desired amount of exposure (correcting the inter-frame flicker) is calculated and the transmittance of the liquid crystal ND filter 12 is set to the calculated transmittance. Accordingly, it is possible to maintain the amount of exposing the image sensor 13 at a constant level, and to effectively correct inter-frame flicker.

Moreover, in this embodiment, learning feedback control is performed so that the blinking cycle of inter-frame flicker is determined and the error in the cycle is in the acceptable range. Accordingly, it is possible to appropriately correct inter-frame flicker that occurs in numerous blinking cycles.

Furthermore, in this embodiment, it is possible to prevent dynamic resolution from being disturbed because an electronic shutter does not need to perform control (of exposure period) to correct the inter-frame flicker.

It should be noted that a method of correcting inter-frame flicker by the gain process performed by the analog signal processing unit 23 to correct inter-frame flicker is conceivable. However, in such a case, noise is generated and the dynamic range is affected in some cases. On the other hand, in this embodiment, these problems do not occur because it does not need to use such a method.

In addition, also a method of performing control by the opening degree of the stop 11 instead of control performed by the liquid crystal ND filter 12 is conceivable. However, this method has such a problem that it is difficult to change the opening degree to another opening degree in a predetermined period (e.g., 33.3 ms) because the stop 11 has a low response speed. On the other hand, it is possible to change the transmittance of the liquid crystal ND filter 12 to another transmittance in the predetermined period (e.g., 33.3 ms).

Moreover, in the case where the stop 11 is used, a blur of the stop 11 reduces the image quality or affects the depth of field in some cases. On the other hand, if the liquid crystal ND filter 12 is used, such a problem does not occur.

It should be noted that it is possible to combine such inter-frame flicker correction with the inter-frame flicker correction according to an embodiment of the present disclosure not for the purpose of excluding the inter-frame flicker correction by an electronic shutter, an analog signal process, and the stop 11.

In the first embodiment, the case where the normal mode and the inter-frame flicker correction mode are switched by the mode switching button has been described. On the other hand, the system controller 19 may automatically switch the normal mode and the inter-frame flicker correction mode. In this case, the system controller 19 may constantly determine whether or not inter-frame flicker has occurred, and switch the normal mode to the inter-frame flicker correction mode in the case where the inter-frame flicker has occurred.

Second Embodiment

Next, a second embodiment of the present disclosure will be described. In the following description, the components having the same configuration and function as those according to the first embodiment will be denoted by the same reference numerals and a description thereof will be omitted or simplified.

In the first embodiment, a method of correcting inter-frame flicker has been described. On the other hand, in the second embodiment, a method of correcting in-frame flicker (flicker generated in a piece of image data) will be described. It should be noted that in the second embodiment, the image sensor 13 is described as a CMOS sensor using a rolling shutter system (line exposure sequential reading system).

(Generation Principle of In-Frame Flicker)

Figure 5:
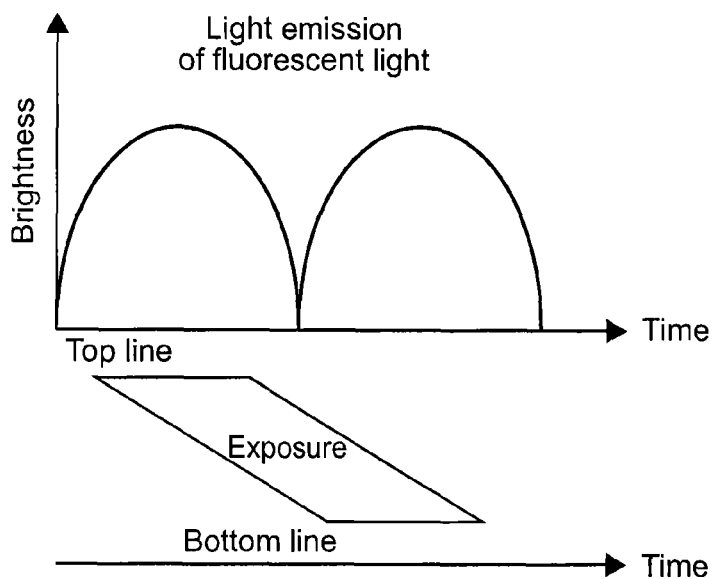
FIG. 5 is a diagram for explaining the generation principle of in-frame flicker.
Figure 6:
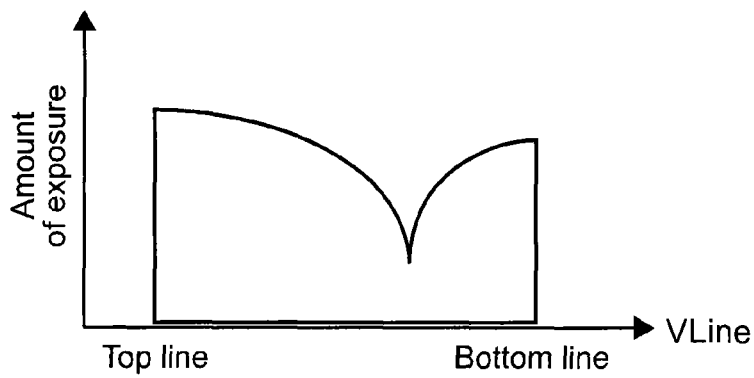
FIG. 6 is another diagram for explaining the generation principle of in-frame flicker.

The generation principle of in-frame flicker will be described first. FIG. 5 and FIG. 6 are each a diagram for explaining the generation principle of in-frame flicker.

With reference to the upper side of FIG. 5, fluorescent light repeats blinking with frequencies (100 Hz, 120 Hz) being two times as large as power supply frequencies (50 Hz, 60 Hz). On the other hand, as shown in the lower side of FIG. 5, the exposure period of a CMOS sensor using a rolling shutter system is different for lines in the horizontal direction.

Figure 7:
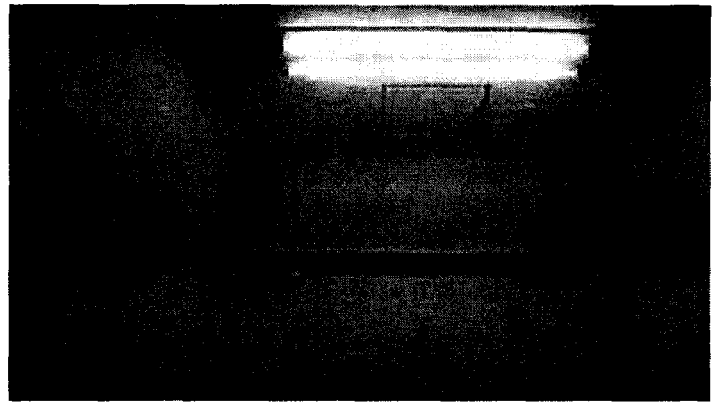
FIG. 7 is a diagram showing a photograph in which exposure unevenness in a sinusoidal wave shape occurs along the vertical direction.

Therefore, as shown in FIG. 6, the amount of exposure is different for lines in the horizontal direction when one piece of image data is captured. Thus, in one piece of image data, exposure unevenness in a sinusoidal wave shape occurs in the vertical direction. This is the generation principle of in-frame flicker. FIG. 7 is a diagram showing a photograph in which exposure unevenness in a sinusoidal wave shape occurs along the vertical direction.

(Explanation of Operation)

Figure 8:
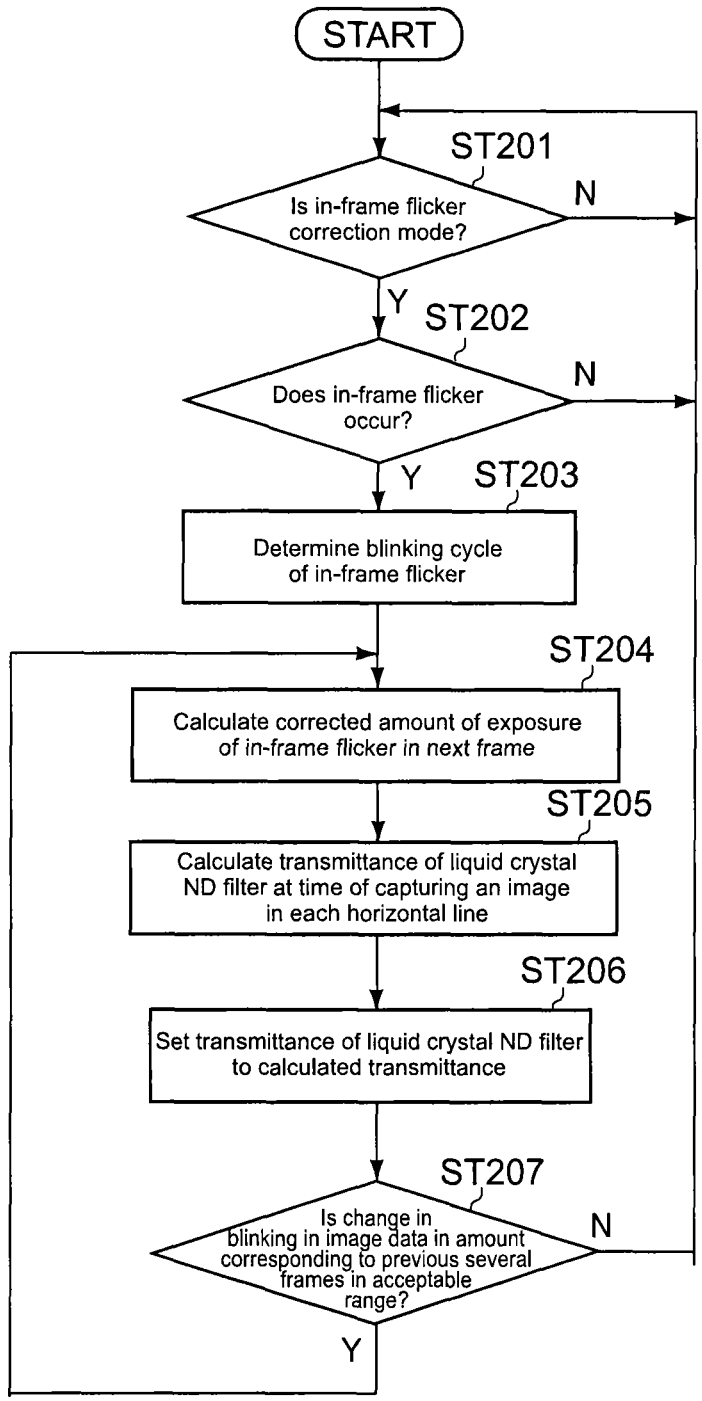
FIG. 8 is a flowchart showing a process performed by an imaging apparatus according to a second embodiment of the present disclosure.

Next, the process performed by the imaging apparatus 1 according to the second embodiment will be described in detail. FIG. 8 is a flowchart showing a process performed by the imaging apparatus 1 according to the second embodiment.

First, the system controller 19 determines whether or not the current mode is the in-frame flicker correction mode (Step 201). It should be noted that switching between the normal mode and the in-frame flicker correction mode can be performed by the mode switching button.

Three modes of the normal mode, the inter-frame flicker correction mode, and the in-frame flicker correction mode may be switched. It should be noted that the inter-frame flicker correction mode and the in-frame flicker correction mode can be performed concurrently.

In the case where the current mode is not the in-frame flicker correction mode (NO in Step 201), the process returns to Step 201, and the system controller 19 determines whether or not the current mode is the in-frame flicker correction mode again.

On the other hand, in the case where the current mode is the in-frame flicker correction mode (YES in Step 201), the digital signal processing unit 25 detects the digital image data input from the A/D conversion unit 24 and outputs the detection results to the system controller 19. Then, the system controller 19 determines whether or not in-frame flicker occurs, based on the detection results (Step 202).

In Step 202, the system controller 19 makes attempts to extract an in-frame flicker component by taking difference between image data in the previous frame and image data in the current frame. Then, in the case where the in-frame flicker component is extracted, the system controller 19 determines that the in-frame flicker has occurred.

In this description, the flicker component is extracted based on two pieces of image data. However, the flicker component may be extracted based on three or more pieces of image data. Alternatively, the flicker component can be extracted based on a piece of image data.

In the case where no in-frame flicker occurs (NO in Step 202), the process returns to Step 201, and the system controller 19 determines whether or not the current mode is the in-frame flicker correction mode again.

On the other hand, in the case where in-frame flicker has occurred (YES in Step 202), the system controller 19 determines the blinking cycle of the in-frame flicker (Step 203). At this time, the system controller 19 determines the blinking cycle of the in-frame flicker based on the flicker component, the drive frame rate of the image sensor 13 (e.g., 30 fps), the exposure time of the image sensor 13, and the transmittance (concentration) of the liquid crystal ND filter 12.

Next, the system controller 19 calculates the corrected amount of exposure of in-frame flicker in the next frame based on the blinking cycle of the in-frame flicker (Step 204). At this time, the system controller 19 calculates the corrected amount of exposure for each horizontal line.

Next, the system controller 19 calculates the transmittance of the liquid crystal ND filter 12 at the time of capturing an image in each horizontal line based on the corrected amount of exposure in each horizontal line (Step 205). In Step 204 and Step 205, the system controller 19 calculates the transmittance for correcting in-frame flicker based on the cycle of the in-frame flicker.

Figure 9:
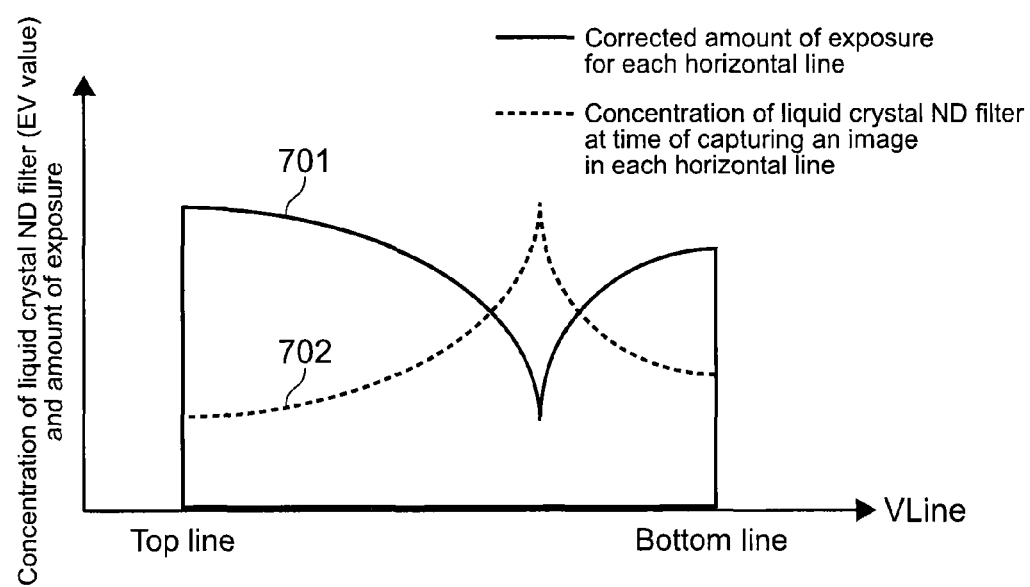
FIG. 9 is a diagram showing the relationship between the corrected amount of exposure for each horizontal line and the transmittance (concentration) of a liquid crystal ND filter 12 at the time of capturing an image in each horizontal line.

FIG. 9 is a diagram showing the relationship between the corrected amount of exposure for each horizontal line and the transmittance (concentration) of the liquid crystal ND filter 12 at the time of capturing an image in each horizontal line. As shown in FIG. 9, the corrected amount of exposure for each horizontal line and the concentration the liquid crystal ND filter 12 at the time of capturing an image in each horizontal line are in an inverse proportion relationship. As described above, it is possible to maintain the amount of exposure for each horizontal line at a constant level by setting the concentration (transmittance) of the liquid crystal ND filter 12. Therefore, it is possible to effectively eliminate the influence of the in-frame flicker.

Next, the system controller 19 sets the transmittance of the liquid crystal ND filter 12 to the calculated transmittance at timing when image data in the next frame is captured by the image sensor 13 (Step 206).

At this time, the system controller 19 causes the image sensor 13 to capture an image while changing the transmittance of the entire liquid crystal ND filter 12 in the exposure period in which exposure is performed in the image sensor 13. It should be noted that the transmittance may be changed for each horizontal line instead of changing the transmittance of the entire liquid crystal ND filter 12.

In the second embodiment, it needs to swiftly change the transmittance of the liquid crystal ND filter 12 in one exposure period. It is possible to change the transmittance in such a short period by using the liquid crystal ND filter 12 having a high-speed responsiveness.

The image data captured by the image sensor 13 is converted into a digital signal by the A/D conversion unit 24 after the analog signal processing unit 23 performs various kinds of processes on the image data. After the digital signal processing unit 25 performs various kinds of processes on the image data, the image data is output from the digital signal processing unit 25.

Then, the image data is displayed on the image display unit 15 as a through image, and is stored in the image storing unit 16 as moving image data or still image data. In the second embodiment, it is possible to eliminate the influence of in-frame flicker in a through image, moving image data, and still image data.

When the transmittance of the liquid crystal ND filter 12 is set, the system controller 19 then determines whether or not the change in blinking in image data in the amount corresponding to previous several frames (e.g., 5 frames) is in the acceptable range (Step 207).

In the case where the change in blinking is in the acceptable range (YES in Step 207), the process of the system controller 19 returns to Step 204 and the processes of Step 204 and the subsequent Steps are performed because the determination of the blinking cycle of in-frame flicker is expected to be accurate.

On the other hand, in the case where the change in blinking in image data in previous several frames is not in the acceptable range (NO in Step 207), the system controller 19 performs processes from Step 201 to Step 203 to determine the blinking cycle of in-frame flicker again because the determination of the blinking cycle of in-frame flicker is not expected to be accurate.

As described above, in the second embodiment, the blinking cycle of in-frame flicker is determined based on image data. Then, based on the blinking cycle of the flicker, a transmittance for correcting the in-frame flicker is calculated and the transmittance of the liquid crystal ND filter 12 is set to the calculated transmittance. Accordingly, it is possible to maintain the amount of exposing the image sensor 13 at a constant level in one exposure period, and thus to effectively correct in-frame flicker.

Moreover, in this embodiment, learning feedback control is performed so that the blinking cycle of in-frame flicker is determined and the error in the cycle is in the acceptable range. Accordingly, it is possible to appropriately correct in-frame flicker that occurs in numerous blinking cycles.

It should be noted that as a method of correcting in-frame flicker, a correction method using a camera signal digital signal processor (DSP) is used in some cases. This is a method of estimating the shape of in-frame flicker that is expected to occur based on the frame rate of the image sensor 13 and setting of the electronic shutter, and performing gain control or signal addition to generate a correction signal based on a database of the shape of in-frame flicker incorporated in the DSP.

In the case where this method is used, such a problem that the dynamic range or the signal-to-noise (S/N) ratio is affected occurs because gain control is performed. In addition, such a problem that it is difficult to treat the in-frame flicker with the database in the DSP occurs because the in-frame flicker countlessly changes.

On the other hand, in the second embodiment, there is no need to use this method. Therefore, the above-mentioned problem does not occur.

In the second embodiment, the case where the normal mode and the in-frame flicker correction mode are switched by the mode switching button has been described. On the other hand, the system controller 19 may automatically switch the normal mode and the in-frame flicker correction mode. In this case, the system controller 19 may constantly determine whether or not in-frame flicker has occurred, and switch the normal mode to the in-frame flicker correction mode in the case where the in-frame flicker has occurred.

Moreover, it is possible to combine the first embodiment with the second embodiment.

It should be noted that the present disclosure may also take the following configurations.

(1) An imaging apparatus, including:
 a transmittance adjusting unit configured to be capable of adjusting a transmittance of light depending on an applied voltage;
 an image sensor configured to capture an image by exposing light that has been transmitted through the transmittance adjusting unit; and
 a controller configured
  to acquire a plurality of pieces of image data by causing the image sensor to capture an image,
  to determine a cycle of flicker between the plurality of pieces of image data based on the plurality of pieces of image data,
  to calculate a transmittance for correcting the flicker between the plurality of pieces of image data based on the cycle of the flicker, and
  to set the transmittance of the transmittance adjusting unit to the calculated transmittance to cause the image sensor to capture an image.

(2) The imaging apparatus according to (1) above, in which the controller is configured
  to acquire image data by causing the image sensor to capture an image,
  to determine a cycle of flicker in the image data based on the image data,
  to calculate a transmittance for correcting the flicker in the image data based on the cycle of the flicker, and
  to set the transmittance of the transmittance adjusting unit to the calculated transmittance to cause the image sensor to capture an image.

(3) The imaging apparatus according to (2) above, in which the controller is configured to cause the image sensor to capture an image while changing the transmittance of the transmittance adjusting unit in an exposure period in which the exposure is performed in the image sensor when setting the transmittance of the transmittance adjusting unit to the calculated transmittance to cause the image sensor to capture an image.

(4) The imaging apparatus according to any one of (1) to (3) above, in which
 the transmittance adjusting unit is a liquid crystal neutral density filter.

(5) An imaging apparatus, including:
 a transmittance adjusting unit configured to be capable of adjusting a transmittance of light depending on an applied voltage;
 an image sensor configured to capture an image by exposing light that has been transmitted through the transmittance adjusting unit; and
 a controller configured
  to acquire image data by causing the image sensor to capture an image,
  to determine a cycle of flicker in the image data based on the image data,
  to calculate a transmittance for correcting the flicker in the image data based on the cycle of the flicker, and
  to set the transmittance of the transmittance adjusting unit to the calculated transmittance to cause the image sensor to capture an image.

(6) An imaging apparatus, including:
a transmittance adjusting unit configured to be capable of adjusting a transmittance of light depending on an applied voltage;
an image sensor configured to capture an image by exposing light that has been transmitted through the transmittance adjusting unit; and
a controller configured to cause the image sensor to capture an image while changing the transmittance of the transmittance adjusting unit in an exposure period in which the exposure is performed in the image sensor.

(7) A method of correcting flicker, including:
acquiring a plurality of pieces of image data by causing an image sensor to capture an image, the image sensor being configured to capture an image by exposing light that has been transmitted through a transmittance adjusting unit configured to be capable of adjusting a transmittance of light depending on an applied voltage;
determining a cycle of flicker between the plurality of pieces of image data based on the plurality of pieces of image data;
calculating a transmittance for correcting the flicker between the plurality of pieces of image data based on the cycle of the flicker; and
setting the transmittance of the transmittance adjusting unit to the calculated transmittance to cause the image sensor to capture an image.

(8) A method of correcting flicker, including:
acquiring image data by causing an image sensor to capture an image, the image sensor being configured to capture an image by exposing light that has been transmitted through a transmittance adjusting unit configured to be capable of adjusting a transmittance of light depending on an applied voltage;
determining a cycle of flicker in the image data based on the image data;
calculating a transmittance for correcting the flicker in the image data based on the cycle of the flicker; and
setting the transmittance of the transmittance adjusting unit to the calculated transmittance to cause the image sensor to capture an image.

(9) A method of correcting flicker, including:
causing an image sensor to capture an image while changing a transmittance of a transmittance adjusting unit in an exposure period in which exposure is performed in the image sensor configured to capture an image by exposing light that has been transmitted through a transmittance adjusting unit configured to be capable of adjusting a transmittance of light depending on an applied voltage.

(10) A program that causes an imaging apparatus to execute the steps of:
acquiring a plurality of pieces of image data by causing an image sensor to capture an image, the image sensor being configured to capture an image by exposing light that has been transmitted through a transmittance adjusting unit configured to be capable of adjusting a transmittance of light depending on an applied voltage;
determining a cycle of flicker between the plurality of pieces of image data based on the plurality of pieces of image data;
calculating a transmittance for correcting the flicker between the plurality of pieces of image data based on the cycle of the flicker; and
setting the transmittance of the transmittance adjusting unit to the calculated transmittance to cause the image sensor to capture an image.

(11) A program that causes an imaging apparatus to execute the steps of:
acquiring image data by causing an image sensor to capture an image, the image sensor being configured to capture an image by exposing light that has been transmitted through a transmittance adjusting unit configured to be capable of adjusting a transmittance of light depending on an applied voltage;
determining a cycle of flicker in the image data based on the image data;
calculating a transmittance for correcting the flicker in the image data based on the cycle of the flicker; and
setting the transmittance of the transmittance adjusting unit to the calculated transmittance to cause the image sensor to capture an image.

(12) A program that causes an imaging apparatus to execute the step of
causing an image sensor to capture an image while changing a transmittance of a transmittance adjusting unit in an exposure period in which exposure is performed in the image sensor configured to capture an image by exposing light that has been transmitted through a transmittance adjusting unit configured to be capable of adjusting a transmittance of light depending on an applied voltage.

It should be understood by those skilled in the art that various modifications, combinations, sub-combinations and alterations may occur depending on design requirements and other factors insofar as they are within the scope of the appended claims or the equivalents thereof.

What is claimed is:
1. An imaging apparatus, comprising:
   a liquid crystal filter configured to be capable of adjusting a transmittance of light depending on an applied voltage;
   an image sensor configured to capture an image by exposing light that has been transmitted through the liquid crystal filter; and
   circuitry configured to
      acquire a plurality of pieces of image data by causing the image sensor to capture an image;
      calculate a cycle of flicker between the plurality of pieces of image data based on the plurality of pieces of image data;
      calculate a transmittance of the liquid crystal filter for correcting the flicker between the plurality of pieces of image data based on the cycle of the flicker; and
      set the transmittance of the liquid crystal filter to the calculated transmittance to cause the image sensor to capture an image.

2. The imaging apparatus according to claim 1, wherein the circuitry is configured to cause the image sensor to capture an image while changing the transmittance of the liquid crystal filter in an exposure period in which the exposure is performed in the image sensor when setting the transmittance of the liquid crystal filter to the calculated transmittance to cause the image sensor to capture an image.

3. The imaging apparatus according to claim 1, wherein the liquid crystal filter is a liquid crystal neutral density filter.

4. A method of correcting flicker, comprising:
acquiring a plurality of pieces of image data by causing an image sensor to capture an image, the image sensor being configured to capture an image by exposing light that has been transmitted through a liquid crystal filter configured to be capable of adjusting a transmittance of light depending on an applied voltage;

calculating a cycle of flicker between the plurality of pieces of image data based on the plurality of pieces of image data;

calculating a transmittance of the liquid crystal filter for correcting the flicker between the plurality of pieces of image data based on the cycle of the flicker; and setting the transmittance of the liquid crystal filter to the calculated transmittance to cause the image sensor to capture an image.

5. A non-transitory computer readable medium including executable instructions, which when executed by a computer cause the computer to execute a method of correcting flicker, the method comprising:

acquiring a plurality of pieces of image data by causing an image sensor to capture an image, the image sensor being configured to capture an image by exposing light that has been transmitted through a liquid crystal filter configured to be capable of adjusting a transmittance of light depending on an applied voltage;

calculating a cycle of flicker between the plurality of pieces of image data based on the plurality of pieces of image data;

calculating a transmittance of the liquid crystal filter for correcting the flicker between the plurality of pieces of image data based on the cycle of the flicker; and setting the transmittance of the liquid crystal filter to the calculated transmittance to cause the image sensor to capture an image.

* * * * *